(12) United States Patent
Yokota et al.

(10) Patent No.: US 11,801,577 B2
(45) Date of Patent: Oct. 31, 2023

(54) 5-AXIS PROCESSING MACHINE

(71) Applicant: Sodick Co., Ltd., Kanagawa (JP)

(72) Inventors: Shoya Yokota, Yokohama (JP);
Michihisa Kawasaki, Yokohama (JP);
Munetaka Ambai, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 450 days.

(21) Appl. No.: 17/201,352

(22) Filed: Mar. 15, 2021

(65) Prior Publication Data
US 2021/0291307 A1    Sep. 23, 2021

(30) Foreign Application Priority Data

Mar. 18, 2020 (JP) .................................. 2020-048350
Apr. 22, 2020 (JP) .................................. 2020-076202

(51) Int. Cl.
| | |
|---|---|
| *B23Q 15/26* | (2006.01) |
| *G05B 19/404* | (2006.01) |
| *B23Q 16/00* | (2006.01) |
| *B23Q 23/00* | (2006.01) |
| *B23C 1/027* | (2006.01) |

(Continued)

(52) U.S. Cl.
CPC .............. *B23Q 15/26* (2013.01); *B23C 1/027* (2013.01); *B23Q 15/12* (2013.01); *B23Q 16/007* (2013.01); *B23Q 23/00* (2013.01); *G05B 19/402* (2013.01); *G05B 19/404* (2013.01); *B23Q 2716/08* (2013.01); *G05B 2219/36262* (2013.01); *G05B 2219/49344* (2013.01)

(58) Field of Classification Search
None
See application file for complete search history.

(56) References Cited

U.S. PATENT DOCUMENTS

| | | | |
|---|---|---|---|
| 9,395,720 B2 * | 7/2016 | Otsuki | ............... G05B 19/4103 |
| 9,454,146 B2 * | 9/2016 | Abe | ................... G05B 19/4086 |
| 2012/0191238 A1 | 7/2012 | Sakai et al. | |

FOREIGN PATENT DOCUMENTS

| | | |
|---|---|---|
| JP | 2012-164306 A | 8/2012 |
| JP | 201365254 A | 4/2013 |

(Continued)

OTHER PUBLICATIONS

Office Action dated Dec. 6, 2021 in Japan Patent Application No. 2020-076202 with English translation; 6 pgs.

(Continued)

*Primary Examiner* — Ryan A Jarrett
(74) *Attorney, Agent, or Firm* — Maier & Maier, PLLC

(57) ABSTRACT

A 5-axis processing machine includes a mounting table on which a tool and a work piece are placed; and a control unit; wherein the mounting table is moved relatively by three linear axes and two rotation axes based on NC data, the two rotation axes include a first axis and a second axis, when the control unit calculates a rotation angle of the two rotation axes, the control unit acquires an axis vector Na that specifies an actual first axis direction and an axis vector Nc that specifies an actual second axis direction, the control unit calculates a posture vector K that specifies a posture at a time of processing the work piece with respect to the tool from the NC data, the control unit calculates, as a solution of a following equation (4), an actual rotation angle θ around the first axis of the tool.

4 Claims, 6 Drawing Sheets

(51) Int. Cl.
    *B23Q 15/12*    (2006.01)
    *G05B 19/402*   (2006.01)

(56)           References Cited

FOREIGN PATENT DOCUMENTS

JP      2013-196130 A    9/2013
JP        201691466 A    5/2016

OTHER PUBLICATIONS

Office Action dated Nov. 16, 2021, in connection with corresponding Japanese Application No. 2020-048350 (8 pp., including machine-generated English translation).

* cited by examiner

5-AXIS PROCESSING MACHINE

CROSS-REFERENCE TO RELATED APPLICATION

This application claims priority to Japanese Patent Applications, JP2020-048350 filed on Mar. 18, 2020, JP2020-076202 filed on Apr. 22, 2020, and the entire contents of which are incorporated by reference herein.

FIELD

The present invention relates to a 5-axis processing machine.

BACKGROUND

Conventionally, a 5-axis machine is known, which has three linear axes and two rotation axes and processes a work piece by changing the relative positions and orientations in the 5 axes of a processing tool and a work piece. For example, Patent Literature 1 discloses a 5-axis processing machine that corrects an error in the rotating shaft for processing.

CITATION LIST

Patent Literature

Patent Literature 1: JP2012-164306 A

SUMMARY

However, in the configuration described in Patent Literature 1, in order to correct the error of the rotation axis, it is necessary to calculate the angle between one of the A-axis and C-axis, which are the rotation axes, and the tool mounting position direction, to calculate the correction rotation angle of the two rotation axes, and to rotate the two rotation axes by the correction rotation angle. Normally, since NC data used at 5-axis processing is required to be very precise, the number of processing points is enormous. As a result, the processing machine described in Patent Literature 1 has a problem that the processing takes a long time.

The present invention has been made in view of such circumstances, and an object of the present invention is to shorten the processing time by realizing processing with faster processing that takes into account the error of the rotating shaft.

According to the present invention, provided is a 5-axis processing machine comprising: a mounting table on which a tool and a work piece are placed; and a control unit; wherein the mounting table is moved relatively by three linear axes and two rotation axes based on NC data, the two rotation axes include a first axis and a second axis, when the control unit calculates a rotation angle of the two rotation axes, the control unit acquires an axis vector Na that specifies an actual first axis direction and an axis vector Nc that specifies an actual second axis direction, the control unit calculates a posture vector K that specifies a posture at a time of processing the work piece with respect to the tool from the NC data, the control unit calculates, as a solution of a following equation (4), an actual rotation angle $\theta$ around the first axis of the tool and an actual rotation angle $\Phi$ around the second axis of the tool when moving the posture from the posture vector K to a posture vector K' based on the axis vectors Na and Nc, the posture vector K that specifies one posture, and the posture vector K' that specifies a next posture.

With such a configuration, it is possible to quickly obtain the rotation angle in consideration of the error of the rotation axis, and to shorten the processing time.

DETAILED DESCRIPTION

Hereinafter, embodiments of the present invention will be described with reference to the drawings. The various features shown in the embodiments shown below can be combined with each other, and each independently constitutes the invention. Further, the X-axis, Y-axis, and Z-axis directions will be defined in the description below based on the coordinates shown in FIG. 1A.

1. The Embodiment (1.1. 5-Axis Processing Machine 100)

Figure 1A:
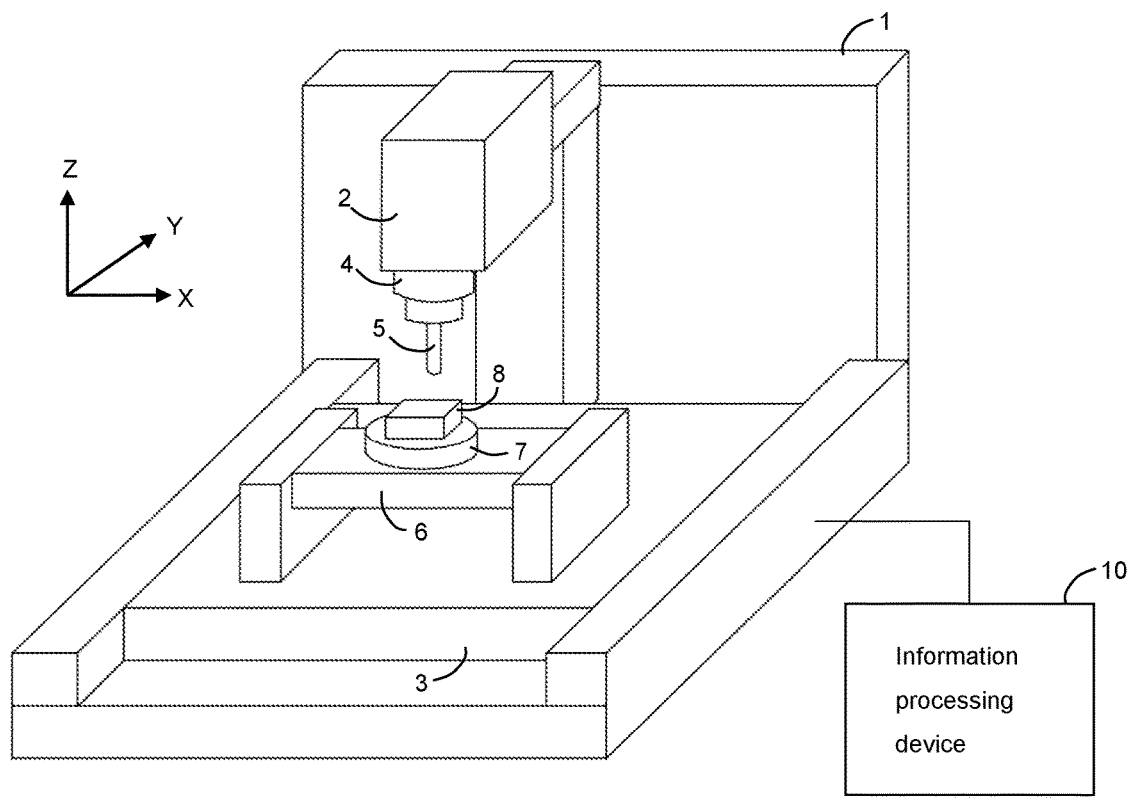
FIG. 1A is a schematic perspective view of a 5-axis processing machine 100 according to an embodiment of the present invention.
Figure 1B:
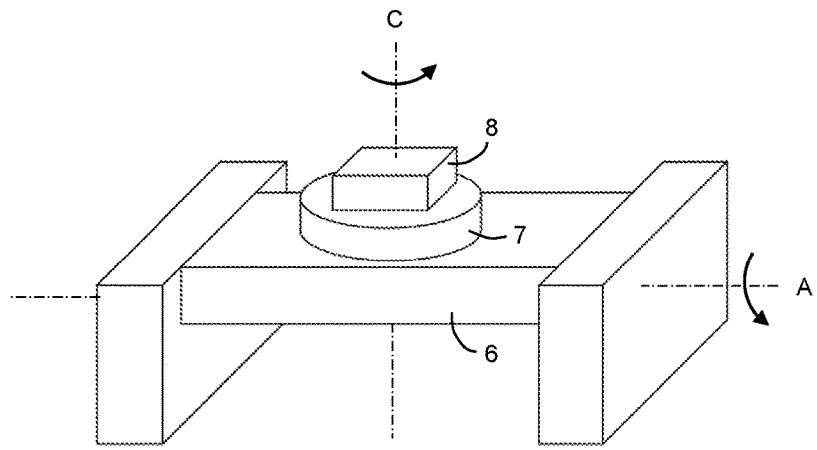
FIG. 1B. is a schematic perspective view of a 5-axis processing machine 100 according to an embodiment of the present invention.

With reference to FIG. 1, a configuration of the 5-axis processing machine 100 will be described. As shown in FIGS. 1A and 1B, the 5-axis processing machine 100 performs 5-axis control of three linear axes of X-axis, Y-axis, and Z-axis, and two rotation axes of A-axis (corresponding to "first axis" in the claims) and C-axis (corresponding to "second axis" in the claims). The 5-axis processing machine 100 includes a processing machine body 1, a processing head 2, a Y-axis moving table 3, and an information processing device 10.

The processing head 2 is configured to be movable in the X-axis direction and the Z-axis direction with respect to the processing machine body 1. The processing head 2 is provided with a mounting portion 4 for mounting a tool 5. By rotating the mounting portion 4, the tool 5 can be rotated to perform cutting.

The Y-axis moving table 3 is configured to be movable in the Y-axis direction with respect to the processing machine body 1. A tilt table 6 is placed on the Y-axis moving table 3. A rotary table 7 is further placed on the tilt table 6. Here, the concept including the tilt table 6 and the rotary table 7 corresponds to "a mounting table" in the claims. The worker can process a work piece 8 by the tool 5 after placing the work piece 8 on the rotary table 7.

The tilt table 6 is configured to be rotatable around the A-axis as a rotation axis, and is placed on the Y-axis moving table 3 so that the A-axis and the X-axis are parallel to each other. The rotary table 7 is configured to be rotatable around the C-axis as a rotation axis, and is placed on the tilt table 6 so that the C-axis and the Z-axis are parallel to each other when the rotation angle of the A-axis is 0°. The posture of the work piece 8 placed on the rotary table 7 with respect to the tool can be changed for machining by rotating the tilt table 6 around the A-axis and the rotary table 7 around the C-axis at arbitrary angles.

As described above, it is desirable that the A-axis of the tilt table 6 is installed parallel to the X-axis and that the C-axis of the rotary table 7 is installed parallel to the Z-axis. However, the A-axis and the C-axis are mounted in a state of being tilted with respect to the X-axis and the Z-axis respectively, due to the processing error or the mounting error of each table. Therefore, in the present embodiment, the actual directions of the rotation centers of the A-axis and the C-axis (hereinafter, also simply referred to as the directions of the A-axis and the C-axis) are measured and used in the processing. The method of measuring the direction of the rotation center of the rotation axis will be described in detail later.

The information processing device 10 analyzes NC data about the processing object and outputs a movement instruction to the processing machine body 1. Hereinafter, the functional configuration of the information processing device 10 will be described in detail.

(1.2. Functional Configuration of Information Processing Device 10)

Figure 2:
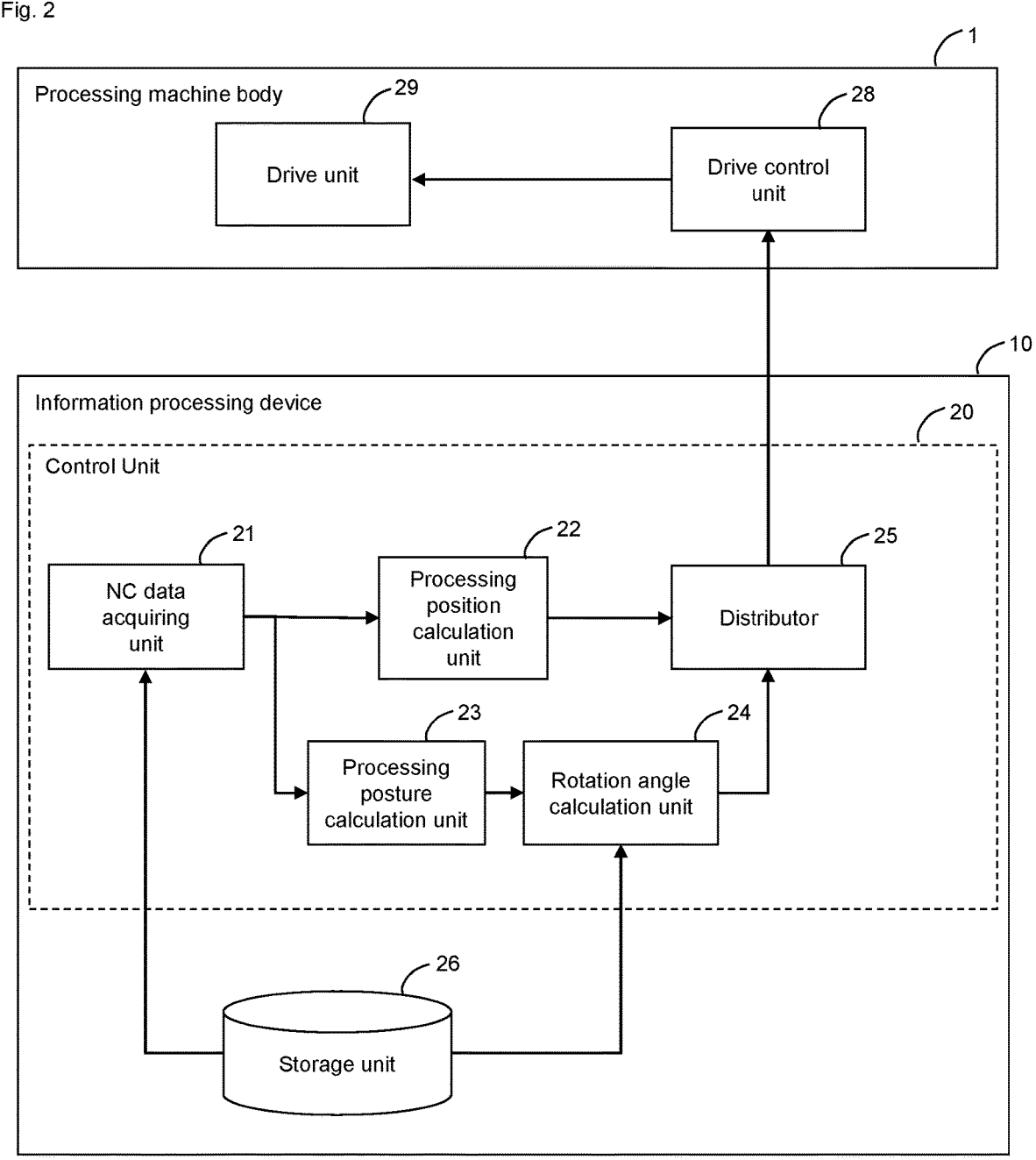
FIG. 2 is a functional configuration diagram of the information processing device 10.

With reference to FIG. 2, the functional configuration of the information processing device 10 will be described. As shown in FIG. 2, the information processing device 10 includes a control unit 20 and a storage unit 26. The control unit 20 is composed of, for example, a CPU (Central Processing Unit), a microprocessor, a DSP (Digital Signal Processor), and the like, and controls the overall operation of the information processing device 10.

The storage unit 26 is composed of, for example, a RAM (Random Access Memory), a DRAM (Dynamic Random Access Memory), or the like, and is used as a work area or the like when the control unit 20 performs processing based on various programs. Further, the storage unit 26 includes a non-volatile memory such as a ROM (Read Only Memory) or an SSD (Solid State Drive), and stores data and programs used for processing of the control unit 20.

The control unit 20 an NC data acquisition unit 21, a processing position calculation unit 22, a processing posture calculation unit 23, a rotation angle calculation unit 24, and a distributor 25.

The NC data acquisition unit 21 acquires NC data about the processing object stored in the storage unit 26. The processing position calculation unit 22 calculates the processing position and the amount of movement along the linear axis direction at each processing point of the work piece 8 based on the acquired NC data.

The processing posture calculation unit 23 calculates the posture of the work piece 8 with respect to the tool 5 at the time of processing at each processing point of the work piece 8 based on the acquired NC data. Here, the NC data is generated assuming that the A-axis and the C-axis are parallel to the X-axis and the Z-axis respectively. The processing posture calculation unit 23 further calculates the posture of the work piece 8 with respect to the tool 5 between the processing points (hereinafter, referred to as an intermediate posture) specified in the NC data. The details of the method of calculating the intermediate posture will be described later.

As described above, the NC data is generated assuming that the A-axis and the C-axis are parallel to the X-axis and the Z-axis. However, in reality, the A-axis and the C-axis may be tilted with respect to the X-axis and the Z-axis respectively, due to mounting errors of the tilt table 6 and the rotary table 7. Therefore, the rotation angle calculation unit 24 calculates the rotation angle θ of the A-axis and the rotation angle Φ of the C-axis in the actual 5-axis control processing machine 100, in order to realize the posture of the work piece 8 at the time of processing calculated by the processing posture calculation unit 23. The details of the calculation method of the rotation angles θ and Φ will be described later.

The distributor 25 distributes and outputs movement instructions for the three linear axes and the two rotating axes to the drive control unit 28 of the processing machine body 1, based on the data output from the processing position calculation unit 22 and the rotation angle calculation unit 24 By controlling the drive unit 29, the drive control unit 28 drives the Y-axis moving table 3, the processing head 2, the tilt table 6, and the rotary table 7, and realizes movement with respect to the three linear axes and the two rotation axes.

(1.3. Measurement Method of the Rotation Center Direction of the Rotation Axis)

Figure 3A:
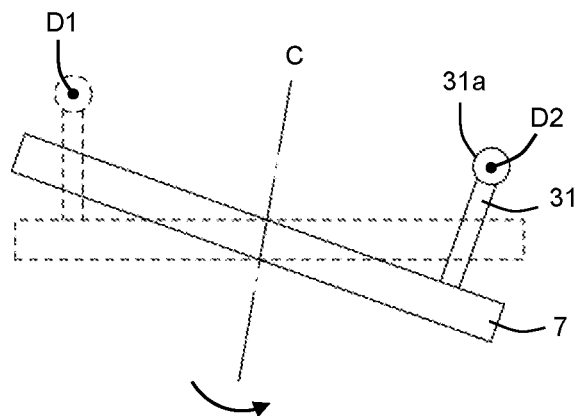
FIG. 3A is a view in which the measuring bar 31 is attached to the rotary table 7.
Figure 3B:
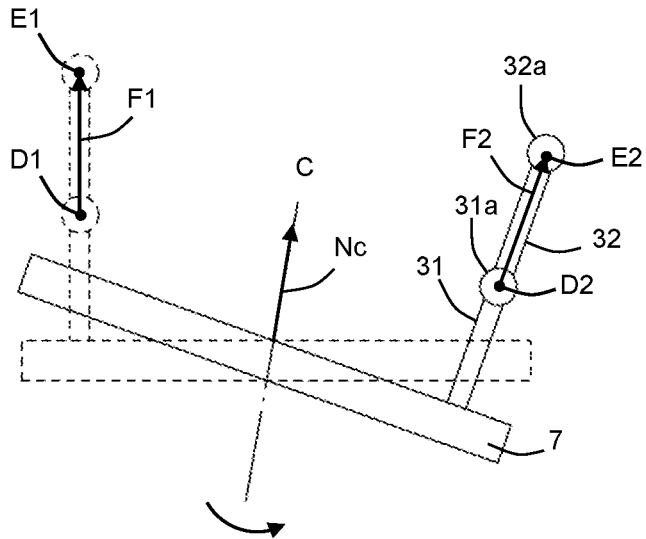
FIG. 3B is a diagram in which the extension bar 32 is attached to the measuring bar 31.

With reference to FIG. 3, a method of measuring the direction of the rotation center of the rotation axis will be described. Various methods are already known for measuring the direction of the rotation axis, but as an example, a method for measuring the direction of the C-axis will be described.

As shown in FIG. 3A, a rod-shaped measuring bar 31 is vertically erected on the rotary table 7 to measure the center position D1 of the reference ball 31a provided on the upper part of the measuring bar 31. After that, the rotary table 7 is rotated by 180°, and the position D2 at the center of the reference ball 31a is measured again.

Next, an extension bar 32 is mounted on the measuring bar 31, and the position E1 at the center of the reference ball 32a provided on the upper part of the extension bar 32 is measured. After that, the rotary table 7 is rotated by 180°, and the position E2 at the center of the reference ball 32a is measured again.

In this way, an axis vector Nc that specifies the direction of the rotation center of the C-axis is defined between the vector F1 obtained by the positions D1 and E1 and the vector F2 obtained by the positions D2 and E2. That is, the axis vector Nc can be obtained from the positions of the first and second points of the rod-shaped object standing vertically on the rotary table 7, and the positions of the first and second points with the rotary table 7 rotated 180 degrees around the C-axis. The calculation of the axis vector Nc need not be performed every time of processing. The axis vector Nc may be calculated at the time of installation of the rotary table 7 and at each maintenance of the 5-axis processing machine 100, and the calculated data may be stored in the storage unit 26.

(1.4. Calculation Method of Intermediate Posture)

Figure 4A:
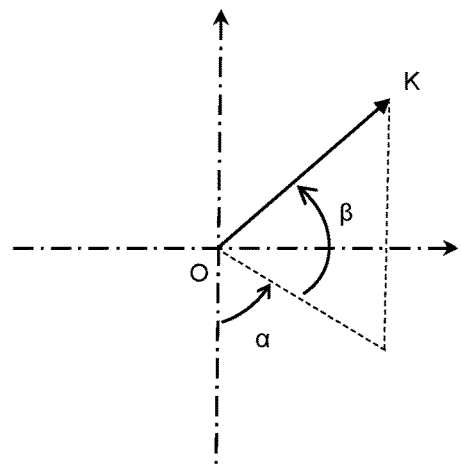
FIG. 4A is a diagram for explaining the posture vector K and the rotation around the rotation axis.

With reference to FIG. 4, the calculation method of the intermediate posture will be described. As described above, the intermediate posture represents the posture of the work piece 8 with respect to the tool 5 between the processing points specified in the NC data. In the present embodiment, the posture of the work piece 8 with respect to the tool 5 is represented by a posture vector K having a size of 1. As shown in FIG. 4A, the rotation angles α and β in the two rotation axes can be uniquely defined by the vector.

Figure 4B:
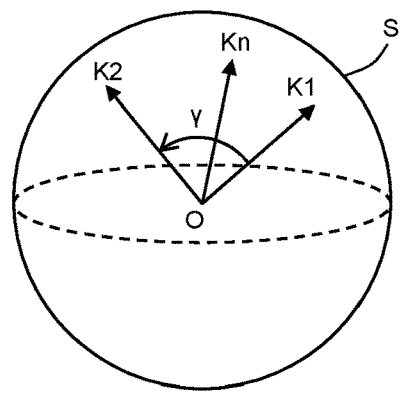
FIG. 4B is a diagram for explaining a posture vector Kn showing an intermediate posture.

In the example shown in FIG. 4B, a posture vector K1 indicating the posture of the work piece 8 with respect to the tool 5 at a certain processing point and a posture vector K2 indicating the posture of the work piece 8 with respect to the tool 5 at the next processing point are shown. In this case, the posture vector Kn between the posture vector K1 and the posture vector K2 is the intermediate posture.

At first, the processing posture calculation unit 23 assumes a great circle distance L on the spherical surface S defined by the posture vector K1 and the posture vector K2. The great circle distance L represents the shortest length between two points on the spherical surface S. The processing posture calculation unit 23 further divides the great circle distance L into a predetermined number and calculates a posture vector Kn that specifies the posture of the work piece 8 with respect to the tool 5 at each division point determined by the division. Here, n is an index ($0 \leq n < N$) representing the position of the division point, and N represents the number of divisions of the great circle distance L.

Figure 4C:
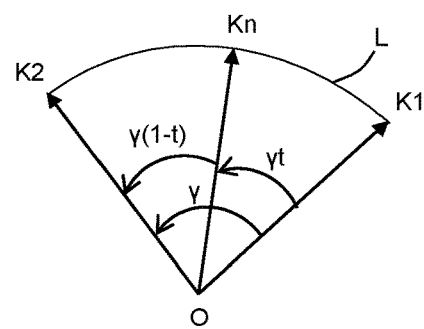
FIG. 4C is a diagram for explaining a method of calculating a posture vector Kn indicating an intermediate posture.

Specifically, as shown in FIG. 4C, the posture vector Kn is obtained by the following equation (1) provided that the rotation angle from the posture vector K1 to the posture vector K2 is γ.

$$K_n = \frac{\sin(\gamma(1-t))}{\sin\gamma} K1 + \frac{\sin(\gamma t)}{\sin\gamma} K2 \tag{1}$$

Here, t is a parameter that takes a value of $0 < t < 1$, and is set according to the number of divisions N of the great circle distance L. For example, the posture vector Kn is obtained for each division point specified by t=0.2, 0.4, 0.6, 0.8 provided that the great circle distance L is divided into five. In this way, the processing posture calculation unit 23 calculates the intermediate posture between the processing points defined in the NC data.

(1.5. Calculation of Rotation Angles θ and Φ)
(1.5.1. Calculation Method of Rotation Angle)

Figure 5A:
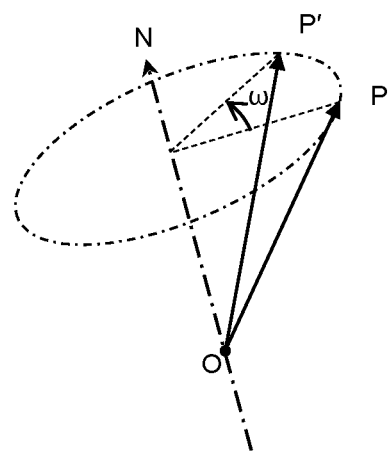
FIG. 5A is a diagram for explaining the rotation of a vector P around an arbitrary vector N.

With reference to FIG. 5A, a method of calculating the rotation angle θ around the A-axis and the rotation angle Φ around the C-axis will be described. First, the rotation angle calculation unit 24 acquires the axis vector Na that specifies the actual A-axis direction and the axis vector Nc that specifies the actual C-axis direction stored in the storage unit 26.

The rotation angle calculation unit 24 calculates the actual rotation angles of the A-axis and the C-axis when moving from the posture vector K that specifies one posture to the posture vector K' that specifies the next posture, with respect to the posture vector K at the processing point and the intermediate posture calculated by the processing posture calculation unit 23. Here, the rotation angle calculation unit 24 uses the Rodrigues rotation formula represented by the following equations (2) and (3).

$$Rn(\omega) = \begin{pmatrix} n_1^2(1-\cos\omega)+\cos\omega & n_1n_2(1-\cos\omega)-n_3\sin\omega & n_1n_3(1-\cos\omega)+n_2\sin\omega \\ n_1n_2(1-\cos\omega)+n_3\sin\omega & n_2^2(1-\cos\omega)+\cos\omega & n_2n_3(1-\cos\omega)-n_1\sin\omega \\ n_1n_3(1-\cos\omega)-n_2\sin\omega & n_2n_3(1-\cos\omega)+n_1\sin\omega & n_3^2(1-\cos\omega)+\cos\omega \end{pmatrix} \tag{2}$$

$$N = \begin{pmatrix} n_1 \\ n_2 \\ n_3 \end{pmatrix} \tag{3}$$

Here, as shown in FIG. 5A, the rotation matrix Rn transforms an arbitrary vector P into a vector P' rotated by an angle ω around the vector N. Using this rotation formula, the rotation angle calculation unit 24 generates the equations represented by the following equation (4) to (8).

$$Ra(\theta) \cdot Rc(\varphi) \cdot K = K' \tag{4}$$

$$Ra(\theta) = \begin{pmatrix} n_{a1}^2(1-\cos\theta)+\cos\theta & n_{a1}n_{a2}(1-\cos\theta)-n_{a3}\sin\theta & n_{a1}n_{a3}(1-\cos\theta)+n_{a2}\sin\theta \\ n_{a1}n_{a2}(1-\cos\theta)+n_{a3}\sin\theta & n_{a2}^2(1-\cos\theta)+\cos\theta & n_{a2}n_{a3}(1-\cos\theta)-n_{a1}\sin\theta \\ n_{a1}n_{a3}(1-\cos\theta)-n_{a2}\sin\theta & n_{a2}n_{a3}(1-\cos\theta)+n_{a1}\sin\theta & n_{a3}^2(1-\cos\theta)+\cos\theta \end{pmatrix} \tag{5}$$

$$Rc(\varphi) = \begin{pmatrix} n_{c1}^2(1-\cos\varphi)+\cos\varphi & n_{c1}n_{c2}(1-\cos\varphi)-n_{c3}\sin\varphi & n_{c1}n_{c3}(1-\cos\varphi)+n_{c2}\sin\varphi \\ n_{c1}n_{c2}(1-\cos\varphi)+n_{c3}\sin\varphi & n_{c2}^2(1-\cos\varphi)+\cos\varphi & n_{c2}n_{c3}(1-\cos\varphi)-n_{c1}\sin\varphi \\ n_{c1}n_{c3}(1-\cos\varphi)-n_{c2}\sin\varphi & n_{c2}n_{c3}(1-\cos\varphi)+n_{c1}\sin\varphi & n_{c3}^2(1-\cos\varphi)+\cos\varphi \end{pmatrix}$$

(6)

$$Na = \begin{pmatrix} n_{a1} \\ n_{a2} \\ n_{a3} \end{pmatrix}$$

(7)

$$Nc = \begin{pmatrix} n_{c1} \\ n_{c2} \\ n_{c3} \end{pmatrix}$$

(8)

Here, Ra (θ) is a rotation matrix that represents a rotation around the A-axis by a rotation angle θ. Rc (Φ) is a rotation matrix that represents a rotation around the C-axis by a rotation angle of Φ. The factor of $n_{a1}$, $n_{a2}$, and $n_{a3}$ are components of vector Na. The factor of $n_{c1}$, $n_{c2}$, and $n_{c3}$ are components of the vector Nc.

Figure 5B:
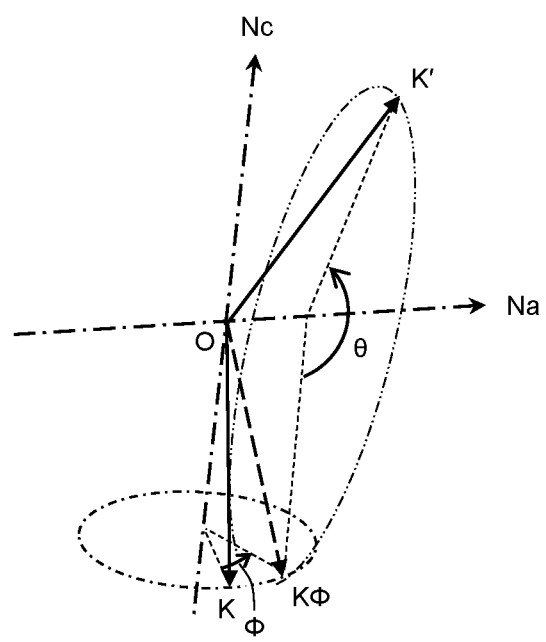
FIG. 5B is a diagram for explaining rotation around the A-axis and the C-axis.

As shown in FIG. 5B, the equation (4) means that the next posture vector K' is obtained when the posture vector K is rotated an angle Φ around the C-axis by the rotation matrix Rc and is rotated an angle θ around the A-axis by the rotation matrix Ra. Here, in FIG. 5B, the vector obtained by rotating the posture vector K an angle Φ around the C-axis is represented by KΦ.

The rotation angle calculation unit 24 solves the equation (4) for θ and Φ. As a result, the rotation angle θ around the A-axis and the rotation angle Φ around the C-axis are calculated when moving the posture from the posture vector K to the next posture vector K' at the processing point calculated by the processing posture calculation unit 23.

(1.5.2. Calculation Procedure)

Hereinafter, the calculation procedure of the rotation angles θ and Φ for the posture vector K and the intermediate posture vector Kn calculated by the processing posture calculation unit 23 will be described.

In the following description, the posture vector is represented as $K_{m,n}$. Here, m is an index (0≤m≤M) representing the position of the processing point, and M represents the number of processing points. Further, n is an index (0≤n<N) representing the position of the division point, and N represents the number of divisions.

Here, $K_{0,0}$ is an initial posture vector indicating the initial posture of the tool, and in this embodiment, $K_{0,0}=(0, 0, 1)$ is set. $K_{m, 0}$ is a posture vector indicating the posture at the m-th processing point. $K_{m, n}$ is the nth intermediate posture vector between the m-th processing point and the m+1-th processing point. $K_{M,0}$ is a posture vector indicating the posture at the final processing point.

First, the intermediate posture vectors $K_{0,n}$ is calculated by the following equation (9), provided that the initial posture vector $K_{0,0}$ is divided into N between the posture vector $K_{1,0}$ of the first processing point, and that the intermediate posture vectors are notated as $K_{0,1}$, $K_{0,2}$, $K_{0,3}$, ..., $K_{0,n}$, ..., $K_{0,N-1}$, respectively. Here, in the case of equal division, $t_n=n/N$.

$$K_{0,n} = \frac{\sin(\gamma(1-t_n))}{\sin\gamma}K_{0,0} + \frac{\sin(\gamma t_n)}{\sin\gamma}K_{1,0} \quad (9)$$

Next, the rotation angles $\theta_{m,n}$, around the A-axis and the rotation angles $\Phi_{m, n}$ around the C-axis are obtained for each intermediate posture. Here, the rotation angles $\theta_{m,n}$ is rotation angle around the A-axis for moving from the n-th intermediate posture vector to the n+1-th intermediate posture vector between the m-th processing point and the m+1th processing point. Similarly, the rotation angles $\Phi_{m, n}$ is the rotation angles around the C-axis for moving from the nth intermediate posture vector to the n+1-th intermediate posture vector between the m-th processing point and the m+1-th processing point. The rotation angles $\theta_{0, n}$, and $\Phi_{0, n}$ satisfy the following equation (10).

$$Ra(\theta_{0,n})\cdot Rc(\varphi_{0,n})\cdot K_{0,n}=K_{0,n+1} \quad (10)$$

In this way, the rotation angles $\theta_{m, n}$ around the A-axis and the rotation angles $\Phi_{m, n}$ around the C-axis are calculated from the initial posture vector $K_{0,0}$ in the order of $K_{0,1}$, $K_{0,2}$, ..., $K_{0, N-1}$, $K_{1,0}$, $K_{1,1}$, ..., $K_{M, 0}$.

The generalization of equations (9) and (10) gives the following equations (11) and (12).

$$K_{m,n} = \frac{\sin(\gamma(1-t_n))}{\sin\gamma}K_{m,0} + \frac{\sin(\gamma t_n)}{\sin\gamma}K_{m+1,0} \quad (11)$$

$$Ra(\theta_{m,n})\cdot Rc(\varphi_{m,n})\cdot K_{m,n} = K_{m,n+1} \quad (12)$$

(1.6. Flow of Processing)

Figure 6A:
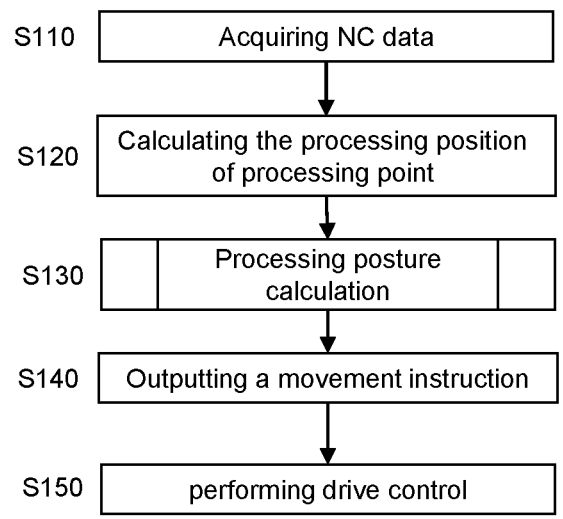
FIG. 6A is a diagram for explaining a processing procedure in the 5-axis processing machine 100.

With reference to FIG. 6, the flow of processing by the 5-axis processing machine 100 will be described. In step S110 of FIG. 6A, the control unit 20 of the information processing device 10 acquires NC data stored in the storage unit 26 for the processing object. In step S120, the control unit 20 calculates the processing position for each processing point.

In step S130, the control unit 20 performs a processing posture calculation. In step S140, the control unit 20 outputs a movement instruction about the three linear axes and the two rotation axes to the processing machine body 1. In step S150, the drive unit 29 performs drive control for the three linear axes and the two rotation axes.

Figure 6B:
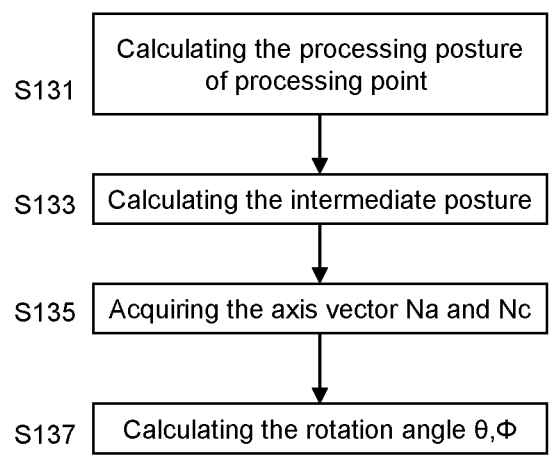
FIG. 6B is a diagram for explaining the procedure of processing posture calculation at step S130 in FIG. 6A.

With reference to FIG. 6B, the flow of the processing posture calculation process (step S130) will be described. In step S131, the processing posture calculation unit 23 calculates the posture vector K that specifies the processing posture for each processing point. In step S133, the processing posture calculation unit 23 calculates the intermediate posture vector Kn for the intermediate posture.

In step S135, the rotation angle calculation unit 24 acquires the data of the axis vector Na and the axis vector Nc from the storage unit 26. In step S137, the rotation angle calculation unit 24 calculates the rotation angles θ and Φ around the A-axis and the C-axis.

2. Other Embodiments

Although the embodiments and variations thereof in the present invention is described above, the application of the present disclosure is not limited to the above contents.

For example, in the above embodiment, the processing posture calculation unit 23 calculates the posture vector Kn in the intermediate posture, but the intermediate posture may be calculated in synchronization with the amount of movement in the three linear axes between the processing points. In this case, the number of divisions is determined to be proportional to the moving distance in the linear axis between the processing positions. As a result, the amount of movement in the linear axis direction and the change in posture are synchronized, and the change in posture can be smoothly performed.

Further, in the above embodiment, the posture of the work piece 8 is controlled by driving the tilt table 6 and the rotary table 7, and the posture of the work piece 8 with respect to the tool 5 is changed. But the present invention is not limited to this form. For example, the posture of the work piece 8 with respect to the tool 5 may be changed by controlling the posture of the tool 5.

Further, in the above embodiment, two rotation axes are provided on the table side such as the tilt table 6 and the rotary table 7, but the present invention is not limited to this embodiment. For example, the present invention can be applied to a form in which one rotation axis is provided on the table side and on the tool side respectively or a form in which a 5-axis processing machine provided with two rotation axes on the tool side.

Further, in the embodiment of the present invention, a 5-axis processing machine having the three linear axes of the X-axis, the Y-axis and the Z-axis and the two rotation axes of the A-axis and the C-axis has been described, but the present invention is not limited to this embodiment. For example, the rotation of the B axis (that is, the rotation axis parallel to the Y-axis) may be controlled instead of the A-axis. Further, the present invention can be applied to a processing machine having 6-axis control of the three linear axes of the X-axis, the Y-axis and the Z-axis and the three rotation axes of the A-axis, the B axis and the C-axis.

Further, in the above embodiment, the NC data for the processing object is stored in the storage unit 26, but the present invention is not limited to this embodiment. For example, NC data may be acquired from another storage medium, or may be acquired directly from an information processing device that generates NC data.

Further, in the above embodiment, the processing machine body 1 and the information processing device 10 are configured as separate devices, but the present invention is not limited to this embodiment. For example, each function included in the information processing device 10 may be built in the processing machine body 1.

Various embodiments according to the present invention have been described above, and these are presented as examples and are not intended to limit the scope of the invention. The novel embodiment can be implemented in various other forms, and various omissions, replacements, and changes can be made without departing from the gist of the invention. The embodiment and its modifications are included in the scope and gist of the invention, and are included in the scope of the invention described in the claims and the equivalent scope thereof.

What is claimed is:

1. A 5-axis processing machine comprising:
   a mounting table on which a tool and a work piece are placed; and
   a control unit; wherein
   the mounting table is moved relatively by three linear axes and two rotation axes based on NC data,
   the two rotation axes include a first axis and a second axis,
   when the control unit calculates a rotation angle of the two rotation axes,
   the control unit acquires an axis vector Na that specifies an actual first axis direction,
   the control unit acquires an axis vector Nc that specifies an actual second axis direction, by calculating the axis vector Nc based on positions of a first and a second points of a rod-shaped object standing vertically on the mounting table, and positions of the first and the second points of the rod-shaped object with the mounting table rotated 180 degrees around the actual second axis,
   the control unit calculates a posture vector K that specifies a posture at a time of processing the work piece with respect to the tool from the NC data,
   the control unit calculates, as a solution of a following equation (4), an actual rotation angle θ around the first axis of the tool and an actual rotation angle Φ around the second axis of the tool when moving the posture from the posture vector K to a posture vector K' based on the axis vectors Na and Nc, the posture vector K that specifies one posture, and the posture vector K' that specifies a next posture, and
   in the equation (4), following relational expressions (5) to (8) hold:

$$Ra(\theta) \cdot Rc(\varphi) \cdot K = K' \quad (4)$$

$$Ra(\theta) = \begin{pmatrix} n_{a1}^2(1-\cos\theta) + \cos\theta & n_{a1}n_{a2}(1-\cos\theta) - n_{a3}\sin\theta & n_{a1}n_{a3}(1-\cos\theta) + n_{a2}\sin\theta \\ n_{a1}n_{a2}(1-\cos\theta) + n_{a3}\sin\theta & n_{a2}^2(1-\cos\theta) + \cos\theta & n_{a2}n_{a3}(1-\cos\theta) - n_{a1}\sin\theta \\ n_{a1}n_{a3}(1-\cos\theta) - n_{a2}\sin\theta & n_{a2}n_{a3}(1-\cos\theta) + n_{a1}\sin\theta & n_{a3}^2(1-\cos\theta) + \cos\theta \end{pmatrix} \quad (5)$$

$$Rc(\varphi) = \begin{pmatrix} n_{c1}^2(1-\cos\varphi) + \cos\varphi & n_{c1}n_{c2}(1-\cos\varphi) - n_{c3}\sin\varphi & n_{c1}n_{c3}(1-\cos\varphi) + n_{c2}\sin\varphi \\ n_{c1}n_{c2}(1-\cos\varphi) + n_{c3}\sin\varphi & n_{c2}^2(1-\cos\varphi) + \cos\varphi & n_{c2}n_{c3}(1-\cos\varphi) - n_{c1}\sin\varphi \\ n_{c1}n_{c3}(1-\cos\varphi) - n_{c2}\sin\varphi & n_{c2}n_{c3}(1-\cos\varphi) + n_{c1}\sin\varphi & n_{c3}^2(1-\cos\varphi) + \cos\varphi \end{pmatrix} \quad (6)$$

-continued $$Na = \begin{pmatrix} n_{a1} \\ n_{a2} \\ n_{a3} \end{pmatrix} \quad (7)$$

$$Nc = \begin{pmatrix} n_{c1} \\ n_{c2} \\ n_{c3} \end{pmatrix} \quad (8)$$

where Ra ($\theta$) is a rotation matrix that represents a rotation around the first axis by a rotation angle $\theta$, Rc ($\Phi$) is a rotation matrix that represents a rotation around the second axis by a rotation angle of $\Phi$, the factor of $n_{a1}$, $n_{a2}$ and $n_{a3}$ are components of vector Na, and the factor of $n_{c1}$, $n_{c2}$ and $n_{c3}$ are components of the vector Nc.

2. The machine of claim 1, wherein when calculating the posture vector K, the control unit acquires a posture vector K1 that specifies a posture as a start point and a posture vector K2 that specifies a posture at an end point from the NC data, the control unit assumes a great circle distance L on a spherical surface S defined by the posture vector K1 and the posture vector K2, the control unit divides the great circle distance L into a predetermined number, and the control unit calculates the posture vector K for each of division points determined by the division.

3. A control method of a 5-axis processing machine comprising:

an acquiring step acquiring an axis vector Na that specifies an actual first axis direction and acquiring an axis vector Nc that specifies an actual second axis direction, by calculating the axis vector Nc based on positions of a first and a second points of a rod-shaped object standing vertically on the mounting table, and positions of the first and the second points of the rod-shaped object with the mounting table rotated 180 degrees around the actual second axis, a first calculation step calculating a posture vector K that specifies a posture at a time of processing a work piece with respect to a tool from NC data, a second calculation step calculating as a solution of a following equation (4), an actual rotation angle $\theta$ around the first axis of the tool and an actual rotation angle $\Phi$ around the second axis of the tool when moving the posture from the posture vector K to a posture vector K' based on the axis vectors Na and Nc, the posture vector K that specifies one posture, and the posture vector K' that specifies a next posture, wherein in the equation (4), following relational expressions (5) to (8) hold:

$$Ra(\theta) \cdot Rc(\varphi) \cdot K = K' \quad (5)$$

$$Ra(\theta) =$$

$$\begin{pmatrix} n_{a1}^2(1-\cos\theta)+\cos\theta & n_{a1}n_{a2}(1-\cos\theta)-n_{a3}\sin\theta & n_{a1}n_{a3}(1-\cos\theta)+n_{a2}\sin\theta \\ n_{a1}n_{a2}(1-\cos\theta)+n_{a3}\sin\theta & n_{a2}^2(1-\cos\theta)+\cos\theta & n_{a2}n_{a3}(1-\cos\theta)-n_{a1}\sin\theta \\ n_{a1}n_{a3}(1-\cos\theta)-n_{a2}\sin\theta & n_{a2}n_{a3}(1-\cos\theta)+n_{a1}\sin\theta & n_{a3}^2(1-\cos\theta)+\cos\theta \end{pmatrix} \quad (6)$$

$$Rc(\varphi) =$$

$$\begin{pmatrix} n_{c1}^2(1-\cos\varphi)+\cos\varphi & n_{c1}n_{c2}(1-\cos\varphi)-n_{c3}\sin\varphi & n_{c1}n_{c3}(1-\cos\varphi)+n_{c2}\sin\varphi \\ n_{c1}n_{c2}(1-\cos\varphi)+n_{c3}\sin\varphi & n_{c2}^2(1-\cos\varphi)+\cos\varphi & n_{c2}n_{c3}(1-\cos\varphi)-n_{c1}\sin\varphi \\ n_{c1}n_{c3}(1-\cos\varphi)-n_{c2}\sin\varphi & n_{c2}n_{c3}(1-\cos\varphi)+n_{c1}\sin\varphi & n_{c3}^2(1-\cos\varphi)+\cos\varphi \end{pmatrix}$$

$$Na = \begin{pmatrix} n_{a1} \\ n_{a2} \\ n_{a3} \end{pmatrix} \quad (7)$$

$$Nc = \begin{pmatrix} n_{c1} \\ n_{c2} \\ n_{c3} \end{pmatrix} \quad (8)$$

where Ra ($\theta$) is a rotation matrix that represents a rotation around the first axis by a rotation angle $\theta$, Rc ($\Phi$) is a rotation matrix that represents a rotation around the second axis by a rotation angle of $\Phi$, the factor of $n_{a1}$, $n_{a2}$ and $n_{a3}$ are components of vector Na, and the factor of $n_{c1}$, $n_{c2}$ and $n_{c3}$ are components of the vector Nc.

4. A manufacturing method of a workpiece by a 5-axis processing machine comprising:

an acquiring step acquiring an axis vector Na that specifies an actual first axis direction and acquiring an axis vector Nc that specifies an actual second axis direction, by calculating the axis vector Nc based on positions of a first and a second points of a rod-shaped object standing vertically on the mounting table, and positions of the first and the second points of the rod-shaped object with the mounting table rotated 180 degrees around the actual second axis, a first calculation step calculating a posture vector K that specifies a posture at a time of processing a work piece with respect to a tool from NC data, a second calculation step calculating as a solution of a following equation (4), an actual rotation angle $\theta$ around the first axis of the tool and an actual rotation angle $\Phi$ around the second axis of the tool when moving the posture from the posture vector K to a posture vector K' based on the axis vectors Na and Nc, the posture vector K that specifies one posture, and the posture vector K' that specifies a next posture, wherein in the equation (4), following relational expressions (5) to (8) hold:

$$Ra(\theta) \cdot Rc(\varphi) \cdot K = K' \tag{4}$$

$$Ra(\theta) = \begin{pmatrix} n_{a1}^2(1-\cos\theta)+\cos\theta & n_{a1}n_{a2}(1-\cos\theta)-n_{a3}\sin\theta & n_{a1}n_{a3}(1-\cos\theta)+n_{a2}\sin\theta \\ n_{a1}n_{a2}(1-\cos\theta)+n_{a3}\sin\theta & n_{a2}^2(1-\cos\theta)+\cos\theta & n_{a2}n_{a3}(1-\cos\theta)-n_{a1}\sin\theta \\ n_{a1}n_{a3}(1-\cos\theta)-n_{a2}\sin\theta & n_{a2}n_{a3}(1-\cos\theta)+n_{a1}\sin\theta & n_{a3}^2(1-\cos\theta)+\cos\theta \end{pmatrix} \tag{5}$$

$$Rc(\varphi) = \begin{pmatrix} n_{c1}^2(1-\cos\varphi)+\cos\varphi & n_{c1}n_{c2}(1-\cos\varphi)-n_{c3}\sin\varphi & n_{c1}n_{c3}(1-\cos\varphi)+n_{c2}\sin\varphi \\ n_{c1}n_{c2}(1-\cos\varphi)+n_{c3}\sin\varphi & n_{c2}^2(1-\cos\varphi)+\cos\varphi & n_{c2}n_{c3}(1-\cos\varphi)-n_{c1}\sin\varphi \\ n_{c1}n_{c3}(1-\cos\varphi)-n_{c2}\sin\varphi & n_{c2}n_{c3}(1-\cos\varphi)+n_{c1}\sin\varphi & n_{c3}^2(1-\cos\varphi)+\cos\varphi \end{pmatrix} \tag{6}$$

$$Na = \begin{pmatrix} n_{a1} \\ n_{a2} \\ n_{a3} \end{pmatrix} \tag{7}$$

$$Nc = \begin{pmatrix} n_{c1} \\ n_{c2} \\ n_{c3} \end{pmatrix} \tag{8}$$

where Ra ($\theta$) is a rotation matrix that represents a rotation around the first axis by a rotation angle $\theta$, Rc ($\Phi$) is a rotation matrix that represents a rotation around the second axis by a rotation angle of $\Phi$, the factor of $n_{a1}$, $n_{a2}$ and $n_{a3}$ are components of vector Na, and the factor of $n_{c1}$, $n_{c2}$ and $n_{c3}$ are components of the vector Nc.

\* \* \* \* \*